Feb. 24, 1931.   G. E. WHITEHEAD   1,794,267
CONNECTION WITH COUPLING-UP OR ISOLATING SWITCHGEAR
Filed Dec. 5, 1927   3 Sheets-Sheet 1

Inventor
George E. Whitehead
By
Attorney.

Patented Feb. 24, 1931

1,794,267

UNITED STATES PATENT OFFICE

GEORGE ETHELBERT WHITEHEAD, OF RHIWBINA, NEAR CARDIFF, WALES

CONNECTION WITH COUPLING-UP OR ISOLATING SWITCHGEAR

Application filed December 5, 1927, Serial No. 237,860, and in Great Britain February 8, 1927.

This invention relates to coupling-up or isolating switchgear and particularly to switchgear of the cubicle type comprising sets of terminals of incoming and outgoing conductors and a circuit breaker adapted to connect such terminals together. For instance, one set of terminals may be connected with the ends of an incoming or outgoing cable or feeder whilst the others comprise bus-bars which may extends into one or more adjacent switchgear cubicles of similar general arrangement for connection therein by circuit breakers to other incoming or outgoing cables or feeders.

In some cases a switchgear cubicle of the kind above specified may also contain within it potential and current transformers and may have disposed on it appropriate electricity meters connected, for instance, by the transformers to certain internal conductors. In switchgear of the kind in question the circuit breakers are usually of the oil-immersed type and in any case it is necessary occasionally to lower or remove the oil tank or the enclosing casing of the circuit breaker so that access may be had to the contacts and working parts for inspection, replacement or repair, and to enable this to be done it is essential in the interests of safety that the circuit breaker, as a whole, be isolated from any conductors which are "alive" or may be rendered alive within the cubicle, and for this purpose the most common practice up to the present date has been to arrange the circuit breaker so that it is movable as a whole with respect to such live conductors, that is to say, the circuit breaker terminals and the bus-bars or cable ends have had associated with them respective sets of co-operating contacts usually plugs and sockets, which can be separated for the purpose of completely isolating the circuit breaker by withdrawing the latter horizontally with respect to the cubicle or lowering it vertically therein, and for this purpose it will be appreciated that owing to the great weight of the circuit breaker particularly in heavy duty switchgear, elaborate, and in some cases complicated gear is necessary, such as wheels and rails in the case of horizontal draw-out type switchgear and lowering and raising tackle such as pulleys and chains or worm and nut gear in the case of drop-down type switchgear. Moreover, the time required to effect the isolation of the circuit breaker in either of the ways above mentioned is considerable, which is disadvantageous when continuity of service is of importance as will usually be the case, particularly in substations, wherein switchgear of the kind above specified has important application.

Moreover, in switchgear wherein isolation of the circuit breaker is effected by drawing out or lowering the latter, a complete system of interlocks is provided in the interests of safety, namely, an interlock between the circuit breaker operating mechanism and circuit breaker draw-out or lowering gear such that the circuit breaker must be opened before it can be isolated and such that the isolation must be discontinued before the circuit breaker can be closed. In the case of cubicle type switchgear it is of course necessary that every current-carrying conductor shall be normally completely enclosed against access from the exterior by individuals and in this respect it is usual to divide the cubicle into a plurality of distinct compartments, to certain of which access may be only had readily under entirely safe conditions. For instance, the bus-bars and the terminals connected with the cable ends are disposed in a single or in respective compartments which, for all intents and purposes, are permanently closed or at any rate can only be opened with considerable difficulty such as when these members have been rendered "dead," and the circuit breaker terminals proper are located in another compartment which is normally closed, but to which access may be had more readily, for instance, by the removal or opening of a panel or door under as safe conditions, that is to say, when the circuit breaker has been drawn out or lowered and thus isolated. It is the usual practice to provide an interlock which will prevent the panel or door being removed or opened until the circuit breaker has been isolated and to prevent the isolation being discontinued until the panel or door has been replaced or closed.

Furthermore, it is the usual practice to employ isolating contacts of elongated form and to arrange that when the circuit breaker is drawn out and closed or lowered and raised respectively, the contacts carried by its terminals are projected into or withdrawn from the adjacent permanently closed compartment or compartments through openings in a partition so that the actual connection is effected in the permanently closed compartment. In order to prevent access to the closed compartment through said openings when the circuit breaker has been isolated, it is the usual custom to provide shutters or doors arranged to close said openings whenever the circuit breaker is isolated. In some cases the transformers are located in the permanently closed compartment, but it is frequently found more convenient to locate them in the compartment wherein the circuit breaker terminals are normally constituted and to arrange them so that they will be isolated from the live contacts whenever the circuit breaker is isolated therefrom.

Similar draw-out or drop-down arrangements have been proposed and used in armoured or so-called "iron-clad" switchgear wherein the conductors are disposed in compound-filled metal casings, more particularly for reducing the space occupied by the switchgear. In both types of switchgear means are usually provided whereby the oil tank may be lowered and an interlock is provided to prevent the tank being lowered unless the circuit breaker has first been opened and then isolated. It will be apparent that considerable space is required to permit the draw-out or lowering of the circuit breaker as a whole and in addition the lowering of the oil tank.

According to the present invention, in a cubicle switchgear of the kind specified, the circuit breaker is fixed in position relative to the bus-bars or cable ends or both upon or in a cubicle framework and the circuit breaker terminals on the one hand are located in a compartment which can be closed, the bus-bars and/or cable end on the other hand being provided with respective fixed contacts which are located in a separate but adjacent compartment which also can be normally permanently closed, whilst simultaneosuly movable coupling contacts connected with the circuit breaker terminals are disposed in the first mentioned compartment and provided therein with mechanism, operable from the exterior of the switchgear, by which said coupling contacts can be projected into or withdrawn from said permanently closed compartment to engage or disengage the contacts therein. An interlock is provided between the circuit breaker and the coupling contacts or between their respective operating mechanisms to ensure that the former is opened before it can be isolated and that the isolation is removed before the circuit breaker can be closed and an interlock is provided between the coupling contacts and the door of the compartment containing them to prevent access to this compartment and its contents unless the latter have been rendered "dead" and to prevent the coupling contacts being closed unless said door has been shut. A further interlock is provided between said coupling contacts and the circuit breaker tank to prevent the latter being removed unless the circuit breaker is isolated.

The movement of the coupling contacts is arranged to operate shutters preventing access to the permanently closed compartment in a manner generally speaking similar to that adopted in connection with switchgear of the draw-out or drop-down type.

With the arrangement of switchgear above set forth the disadvantages of draw-out or truck type and drop-down type switchgear are avoided whilst the advantages thereof are retained and without loss of safety, since the circuit breaker can be isolated at any time without the necessity for drawing it out or lowering it and also safe access may then be had to its terminals and to the movable coupling contacts, the latter being withdrawn from the closed compartment containing the contacts which are or may be alive. Since the coupling contacts will be of comparatively small mass, the isolation can be very easily effected by comparatively light gear. A simpler, cheaper, more convenient and more compact construction results.

According to a further important feature of the invention a single mechanism is provided by which the coupling contacts are first withdrawn and the oil tank subsequently lowered and preferably this is brought about by continued movement in one direction of the external operating member such as a hand-wheel or lever, such feature providing a simple and effective interlock between the coupling contacts and the oil tank. Specific forms of such mechanism also constituting subsidiary features of the invention will be hereinafter described in detail.

A further important feature of the invention comprises an arrangement of coupling contacts whereby selective connection may be effected in a simple manner, for instance, to alternative sets of bus-bars or cable ends. For this purpose the coupling contacts may be of the throw-over type and provided with means whereby they can be thrown over from one operative position to another, when required and when the circuit breaker is isolated so that they will engage, when the isolation is to be removed, with one or other sets of the co-operating contacts located in th permanently closed compartment of the cubicle.

In carrying out the invention, the movable coupling contacts may be of the plug and socket type adapted to engage socket or plug contacts connected with the bus-bars and/or cable ends and making slidable or telescopic connection within tubular members associated with the terminals of the circuit breaker, said movable coupling contacts and tubular members being preferably enclosed in insulating material. The coupling contacts may however assume other forms.

To enable the invention to be clearly understood the features thereof above set forth and other minor features thereof will now be described with reference to the accompanying drawings, which illustrate by way of example two convenient forms of switchgear and in which.

Referring to the drawings the switchgear therein illustrated comprises in general a cubicle formed of a plurality of main frame members 1 and divided into two main compartments 2 and 3, of which the upper compartment 2 is closed by fixed panels, the lower compartment 3 being closed at the front by means of a door which can be removed under safe conditions as will be hereinafter described. The compartments 2 and 3 are separated by means of a fixed partition 4 secured to transverse frame members 5. The compartment 3 is closed at the bottom by the head 6 of the oil circuit breaker which is carried upon transverse frame members 7. The upper compartment may contain terminals connected with the ends of two cables which are adapted to be connected together by the switchgear. More usually however, the upper compartment will contain a set of terminals connected with an incoming or outgoing cable or feeder and one or more sets of bus-bars the latter extending horizontally across the switchgear and being extensible, that is to say, being adapted to be connected with similar bus-bars in switchgear of similar construction disposed on either side of the switchgear cubicle now being described. Current transformers may be located either in the compartment 2 or the compartment 3 and a potential transformer may be conveniently located behind or on the top of the cubicle, for instance, as may be found convenient. In the switchgear illustrated in the accompanying drawings the compartment 2 contains at least one set of three bus-bars 8 which are supported on insulators 9 which in turn are carried upon a transverse frame member 10. The conductors of an incoming or outgoing three-phase cable or feeder 11 are divided in a trifurcating box 12 and the conductor ends 13 brought into the compartment 2. Apart from the operating handle 14 of the oil circuit breaker no details of contacts or actuating mechanism of the latter are shown or described since these per se form no part of the present invention and may assume any convenient form. The circuit breaker terminals are indicated at 15 and 16 and these are connected respectively with the bus-bars 8 and the cable ends 13 provision being made for isolating the circuit breaker terminals from the cable and bus-bars, the present invention having particular relation, as previously herein set forth, to the isolating arrangements, apart from which the devices so far described are of general ordinary construction.

Figure 1:
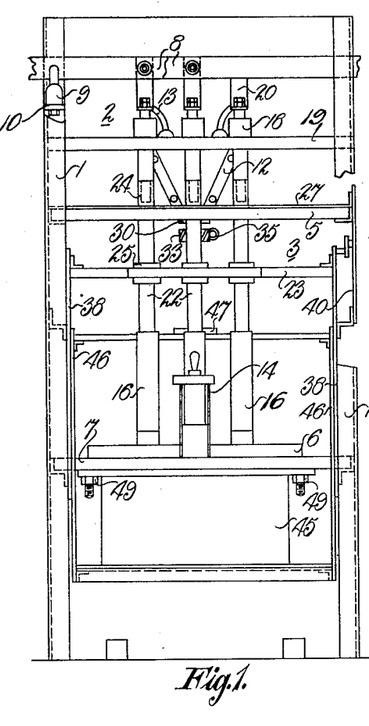
Fig. 1 is a front elevation of one form of switchgear with the panels or doors removed and certain parts shown broken away.
Figure 2:
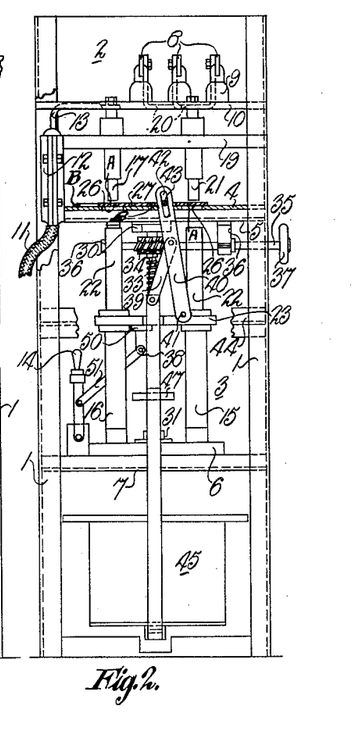
Fig 2 is a side elevation partly in section of the switchgear shown in Fig. 1, the isolating switch being lowered in Fig. 2 and the shutters closed.
Figure 3:
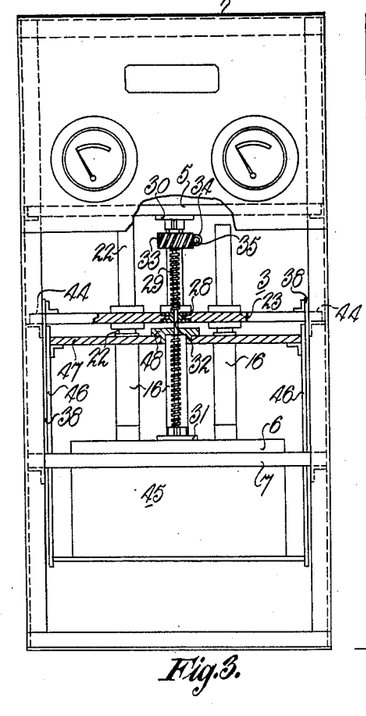
Fig. 3 is another front view with certain other parts in section and showing more particularly the operating gear.

Referring now particularly to Figs. 1, 2 and 3 the head 6 of the circuit breaker is in effect permanently fixed in position on the framework of the cubicle. The cable ends 13 are connected with downwardly directed contacts 17 carried in insulators 18 mounted upon a transverse frame member 19. The bus-bars 8 are connected by means of a plurality of conductors 20 with terminals 21 similar to the terminals 17 and similarly mounted and disposed. The terminals 17 and 21 are essentially located above the partition 4. The terminals 15 and 16 of the circuit breaker are tubular and elongated and slidably or telescopically receive a plurality of coupling contacts 22 which are collectively fixed in a carriage 23 on either side of which they extend as shown. The upper ends of the contacts 22 are in the form of sockets as indicated by dotted lines at 24 in Fig. 1 and are adapted to engage the contacts 17 and 21 which are in the form of co-operating plugs. The upper portions of the contacts 22 are conveniently surrounded by insulating material. Said coupling contacts are conveniently carried in insulating bushes 25.

The partition 4 is provided with two openings 26 or two sets of openings through which the upper ends of the coupling contacts 22 can be projected to engage the contacts 17 and 21 in the closed compartment 2. The openings 26 are adapted to be closed by means of a shutter 27 when the contacts 22 are withdrawn as will be hereinafter more fully described.

As shown in section in Fig. 3 the carriage 23 is provided with a travelling nut 28 adapted to work upon a screwed spindle or worm 29 the ends of which are mounted in a bearing 30 secured beneath the partition 4 and in a bearing 31 secured on the head 6 of the circuit breaker. The central portion 32 of the screwed spindle or worm 29 is threadless for a purpose to be hereinafter described. A worm wheel 33 is secured to the upper end of the spindle 29 and is adapted to be rotated by means of a worm 34 secured to a spindle 35 mounted in bearing brackets 36 and brought out to the front of the cubicle being there provided with an operating handle 37 as clearly shown in Fig. 2. The carriage 23 may thus be raised and lowered so that the contacts 22 and 17, 21 can be connected together when desired by rotating the hand-wheel 37.

The ends of the carriage 23 are secured to bars 38 which are constrained by means of guides (not shown) for vertical movement. The upper ends of the bars 38 are connected by means of links 39 which in turn are connected to levers 40 pivoted at 41 to transverse members of the cubicle framework. The upper ends of the levers 40 are provided with slots 42 engaged by pins 43 connected with the shutter 27 which is constrained to slide horizontally in a direction from right to left in Fig. 2 the arrangement being such that whenever the coupling contacts 22 are withdrawn the perforations 26 in the partition 4 will be closed by the shutter 27.

The arrangement of the operating mechanism is such that when the coupling contacts 22 are completely withdrawn the carriage 23 will rest upon transverse frame members 44 and the nut 28 will have passed beyond the upper screw thread of the spindle 29 into the threadless or idle portion 32 thereon.

The oil tank 45 of the circuit breaker is carried by a pair of bars 46 which are constrained for vertical movement parallel with and adjacent the bars 38. The bars 46 are secured at their upper ends to a transverse frame 47 to which is secured a travelling nut 48 adapted to co-operate with the lower threaded portion of the spindle or worm 29, the arrangement being such that when the oil tank 45 is in the raised position bolted to the circuit breaker head 6 or to the transverse members 7, the nut 48 lies in the idle portion 32 of the screwed spindle or worm. When however, the tank-holding bolts or the nuts 49 are slackened off a few turns the nut 48 will engage the lower screw-threaded portion of the spindle 39 which latter therefore supports the oil tank so that the nuts 49 may be removed and by rotating the external hand-wheel 37 in the same direction as the rotation thereof which has previously withdrawn the coupling contacts 22 the oil tank may be lowered. A spring 29ª is provided between the members 28 and 48 to cause the member 28 to engage the thread 29 when the coupling contacts are to be closed. It will thus be appreciated that the operating gear is of unusual simplicity and that by the arrangement described involving the screwed spindle or worm 29, the carriage 23 and the transverse frame 47 an effective safety interlock is provided which in effect is double-acting, that is to say, it is necessary to raise the oil tank 45 and secure it in position before the coupling contacts 22 can be raised to remove the isolation from the circuit breaker. In addition an interlock which is itself not new and which is not illustrated since it may assume a variety of forms, is provided between the door or panel (not shown) which encloses the front of the lower compartment 3 of the cubicle switchgear. Such interlock may comprise a catch which holds the door locked in position on the cubicle until the circuit breaker has been isolated and a further catch released by the removal or opening of the panel or door which will prevent the coupling contacts 22 being raised unless the panel or door is replaced or closed. A further interlock is provided between the operating handle 14 of the oil circuit breaker and the coupling contacts 22. Such interlock may comprise in effect, as somewhat diagrammatically shown in Fig. 2, an obstruction 50 which is placed in the path of the carriage 23 or some other part of the isolating gear whenever the circuit breaker is closed and is removed by a link 51 when the circuit breaker is opened.

Figure 4:
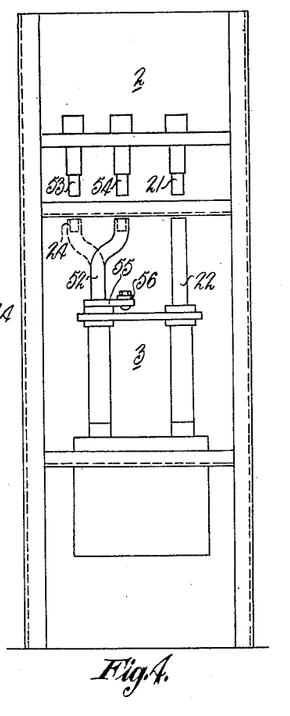
Fig. 4 is a side elevation illustrating a modified form of coupling contact for use when duplicate sets of bus-bars are provided.

Referring now to Fig. 4 this illustrates a construction of switchgear which is or may be substantially the same as that shown in Figs. 1, 2 and 3 with the exception that there are duplicate sets of bus-bars (not shown) adapted to be alternatively connected to cable ends or a single set of bus-bars adapted to be alternatively connected to the ends of two cables. To permit such alternative connection one set of the coupling contacts contains cranked members 52 as clearly shown in Fig. 4 adapted to be rotated through an angle such that the socket portions 24 thereof will engage either the counterpart plug terminals 53 or the plug terminals 54 located in the upper compartment 2 of the switchgear. The other coupling contacts 22 may be similar to those previously described and adapted to engage the contacts 21 in the compartment 2. The angular movement of the contacts 22 may be effected in any convenient manner. For instance, the several contacts may be provided with respective radial arms 55 which are connected by a coupling rod 56 the latter being provided with an interlock to permit the change over being effected only under safe conditions.

Figure 5:
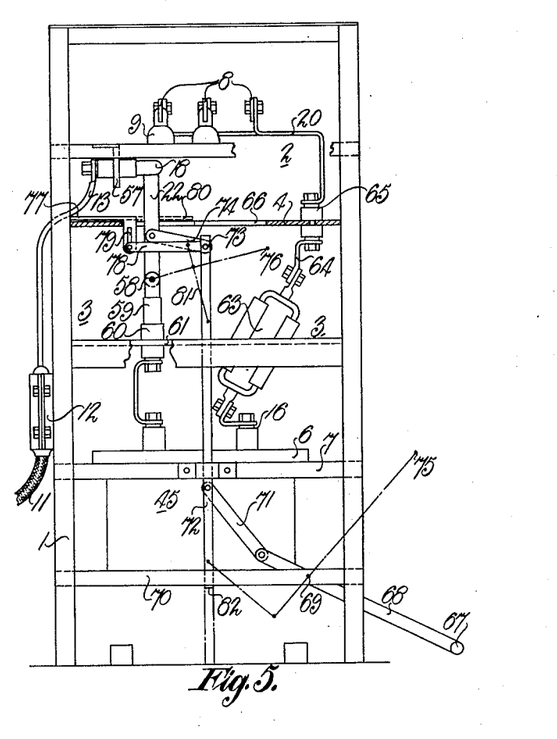
Fig. 5 is a side elevation with certain parts in section of a modified form of switchgear in accordance with the invention.

Referring now to Fig. 5 in the arrangement therein illustrated it is to be assumed that the cable 11 is normally alive and is required to be connected by the oil circuit breaker to the bus-bars 8 which can thus be rendered dead by opening the circuit breaker. Other arrangements, however, are possible the main variant of Fig. 5 being that coupling contacts of the knife blade and jaw type are employed instead of telescopic plug and socket contacts as shown in and as described with reference to Figs. 1 to 4. The cable enters a trifurcating box 12 wherein the cable ends 13 are separated, being connected with insulated terminals 18 carried in insulated bushes on a transverse member 57. The contacts 18 are of the jaw type and adapted to be engaged by the knife blade type coupling contacts 22 which are pivoted at 58 to jaws 59 carried in insulating bushes 60 on a transverse member 61 and being connected by conductors 62 to the terminals 15 of the circuit breaker. The other terminals 16 of the circuit breaker are connected through current transformers 63, through conductors 64, insulated terminals 65 and conductors 20 to the bus-bars 8. It will be noticed that as before, the live contacts 18 are located entirely within the upper compartment 2 and that since the bus-bars can be rendered dead by opening the circuit breaker the current transformers 63 may conveniently be located as shown in the lower compartment 3 of the cubicle.

The partition 4 between the compartments 2 and 3 is provided with a plurality of slots 66 through which the knife blade coupling contacts 22 can be projected. The movements of the contacts 22 are effected by means of an external handle 67 upon a lever 68 pivoted at 69 to a transverse frame member 70, the inner end of the lever 68 being connected by means of a link 71 with a bar 72 which is constrained for vertical sliding movement. Preferably levers 68, links 71 and bars 72 are provided at both sides of the cubicle. The upper ends of the bar 72 are connected together by a spindle 73 and upon this shaft are pivotally connected links 74 which are respectively connected with the coupling contacts 22, and the arrangement is such that when the handle 68 is pulled upwards to the position indicated by dotted lines at 75 the contacts 22 will be turned downwards out of the compartment 2 to the position indicated by dotted lines at 76 in the compartment 3. As in the arrangement previously described in connection with Figs. 1 to 3 a protective shutter 77 is provided in the compartment 2, this shutter being actuated by means of links 78 connected to the shaft 73 and having pins engaging slots 79 in downwardly depending portions connected to or integral with the shutter 77, the arrangement being such that when the handle 67 is moved upwards to effect isolation the shutter 77 will be moved to the position indicated in dotted lines at 80, the links 78 then assuming the position indicated by dotted lines at 81.

In some cases the bars 72 may be connected together at their lower extremities 82 by means of a cross bar which when the contacts 22 and 18 are closed lies immediately beneath the oil tank 45 whereby an interlock is provided preventing the removal of the oil tank unless isolation has been effected.

Since, with the arrangement just described, continued movement of the external operating handle 67 in an upward direction effects consecutively the isolation of the circuit breaker and the lowering of the oil tank thereof, this arrangement may be found, in some cases, more convenient with comparatively smaller switchgear than the screw and nut gear shown in Figs. 1–3.

It will be understood that the current transformer 63 may be located elsewhere and in effect replaced by a further set of isolating contacts. Provision may be made whereby the knife blade contacts can be thrown over for alternatively engaging one or other of two sets of contacts.

It will be understood that various modifications may be made without departing from the scope of the invention. For instance, other forms of safety shutter may be employed. It will also be understood that other forms of operating mechanism for the coupling contacts may be employed and that the screw or the lever mechanism may be used in either or both types of switchgear as may be convenient as governed by particular conditions and weight.

Throughout the specification and in the appended claims the expression "permanently closed compartment" is intended to mean a compartment which, since it contains conductors which will frequently be alive, is so closed that the ordinary power station attendants and workmen cannot have access to the conductors, it being necessary for this purpose to isolate the conductors elsewhere and possibly outside the power station. Of course, strictly speaking, the compartment will not, in fact, be permanently closed because, as will be well understood, it is at times necessary to inspect and possibly repair or alter the internal conductors. Thus, when setting up the switch gear the compartment will not be riveted or welded up so that the interior can never again be got at. For the purpose of this invention it will be readily understood by those skilled in the art that "permanently closed" means so closed that the interior can only be got at with considerable difficulty. This applies to practically all high tension switch gear.

I claim as my invention:—

1. A switchgear including a housing divided into two compartments, a circuit breaker located in one compartment, an insolating switch having fixed members permanently located in the other compartment and having the movable members mounted in the first compartment, portions thereof being movable into and out of the compartment containing the fixed members, means for operating the movable members of the isolating switch, a closure between the two compartments operably connected to the operating means to be closed when the movable members of the isolating switch are apart and to be opened when the isolating switch members are engaged, a removable protective cover for the circuit breaker, means releasably holding said cover in position, and means for connecting said cover to the operating means whereby, the holding means having been released, the cover is removed from the circuit breaker as the isolating switch is opened, and before the switch is closed the cover is returned to encase the circuit breaker.

2. An electrical isolating switchgear comprising a cubicle framework divided into a plurality of compartments one of which is permanently closed and separated from a second and adjacent compartment by a perforated partition, a set of fixed terminals in said permanently closed compartment, a circuit breaker located with its terminals in said adjacent compartment and so mounted with respect to the switchgear that whilst it can be readily removed therefrom when electrically isolated it cannot be moved for the purpose of effecting its electrical isolation, an isolating switch for said circuit breaker comprising a set of movable contacts located principally within the second compartment and a set of fixed counterpart contacts located entirely within the permanently closed compartment and electrically connected with terminals therein, actuating mechanism for said isolating switch located entirely within the adjacent compartment but operable from the exterior of the switchgear and causing portions of said movable contacts to be projected through the perforated partition into and to be withdrawn from the permanently closed compartment, and means whereby access may be had to said second compartment only when the circuit breaker is fully electrically isolated.

3. An electrical type isolating switchgear comprising a cubicle framework divided into a plurality of compartments one of which is permanenty closed and separated from a second adjacent compartment by a perforated partition, a set of fixed terminals in said permanently closed compartment, a circuit breaker located with its terminals in said adjacent compartment and so mounted with respect to the switchgear that whilst it can be readily removed therefrom when electrically isolated it cannot be moved for the purpose of effecting its electrical isolation, an isolating switch for said circuit breaker comprising a set of movable contacts located principally within the second compartment and a set of fixed counterpart contacts located entirely within the permanently closed compartment and electrically connected with terminals therein, actuating mechanism for said isolating switch located entirely within the second compartment but operable from the exterior of the switchgear and causing portions of said movable contacts to be projected through the perforated partition into and to be withdrawn from the permanently closed compartment, movable safety shutters for the perforated partition, and mechanism whereby said shutters will be automatically moved to their closed position whenever the isolating switch is open and to their open position whenever the isolating switch is closed.

4. A cubicle type isolating switchgear comprising a cubicle framework divided into a plurality of compartments one of which is permanently closed and separated from a second adjacent compartment by a perforated partition, a set of fixed terminals in said permanently closed compartment, a circuit breaker located with its terminals in said adjacent compartment and so mounted with respect to the switchgear that whilst it can be readily removed therefrom when electrically isolated it cannot be moved for the purpose of effecting its electrical isolation, an isolating switch for said circuit breaker comprising a set of movable contact members located principally within the second compartment and a set of fixed counterpart contacts located entirely within the permanently closed compartment and electrically connected with terminals therein, actuating mechanism for said isolating switch located entirely within the semi-permanently closed compartment but operable from the exterior of the switchgear and causing portions of said movable contact members to be projected through the perforated partition into and to be withdrawn from the permanently closed compartment, and an interlock between the circuit breaker operating member and the isolating switch to prevent the latter being operated unless the circuit breaker is open and to prevent the circuit breaker being closed before the isolating switch is closed.

5. A cubicle type isolating switchgear comprising a cubicle framework divided into a plurality of compartments one of which is permanently closed and separated from an adjacent compartment by a perforated partition, a door on the second compartment, a set of fixed terminals in said permanently closed compartment, a circuit breaker located with its terminals in said adjacent compartment and so mounted with respect to the switchgear that whilst it can be readily removed therefrom when electrically isolated it cannot be moved for the purpose of effecting its electrical isolation, an isolating switch for said circuit breaker comprising a set of movable contact members located principally within the second compartment and a set of fixed counterpart contacts located entirely within the permanently closed compartment and electrically connected with terminals therein, actuating mechanism for said isolating switch located entirely within said second compartment but operable from the exterior of the switchgear, for causing portions of said movable contacts to be moved through said perforated partition, an interlock between the circuit breaker and the isolating switch to prevent operation of either in an incorrect sequence, and an interlock between the isolating switch and said compartment door to prevent the door being opened unless the isolating switch is open and to prevent the switch being closed before the door has been closed.

6. A switchgear comprising a substantially closed frame structure carrying a set of fixed contacts, a circuit breaker, means for releasably holding said casing in position, a movable casing for the circuit breaker, an isolating switch for said circuit breaker, and a single mechanism which when operated in one direction first opens the isolating switch and then removes the casing of the circuit breaker when the holding means are released and when operated in the other direction first replaces said casing and then closes said isolating switch.

7. A switchgear comprising a substantially closed frame structure carrying a set of fixed contacts, a circuit breaker, an isolating switch for said circuit breaker having contacts movable into and out of engagement with said fixed contacts, a screw threaded shaft, external means for rotating said shaft, a pair of carriages for the moving contacts of the isolating switch and the casing of the circuit breaker respectively, and a pair of nuts operating on said shaft and constrained against rotation, said nuts being operatively associated one with each carriage.

8. A cubicle type isolating switchgear comprising a cubicle frame work divided into a plurality of compartments one of which is permanently closed and separated from a second and adjacent compartment by a perforated partition, a set of fixed terminals in said permanently closed compartment, a circuit breaker located with its terminals in said adjacent compartment and so mounted with respect to the switchgear that whilst it can be readily removed therefrom when electrically isolated it cannot be moved for the purpose of effecting its electrical isolation, a plug-and-socket type isolating switch for said circuit breaker comprising a set of contacts having telescopic connection with the circuit breaker terminals and located within the second compartment and a set of fixed counterpart contacts located entirely within the permanently closed compartment and electrically connected with terminals therein, and actuating mechanism for said isolating switch located entirely within said second compartment but operable from the exterior of the switchgear and causing said telescopically connected contacts to be projected through the perforated partition into and to be withdrawn from the permanently closed compartment.

9. A cubicle type isolating switchgear comprising a cubicle framework divided into a plurality of compartments in permanently fixed relation to each other one of which is permanently closed and separated from an adjacent compartment by a perforated partition, a plurality of sets of fixed terminals in said permanently closed compartment, a circuit breaker located with its terminals in said adjacent compartment and so mounted with respect to the switchgear that whilst it can be readily removed therefrom when electrically isolated it cannot be moved for the purpose of effecting its electrical isolation, an isolating switch for said circuit breaker comprising a set of movable contacts located principally within the second compartment, a plurality of sets of fixed counterpart contacts located entirely within the permanently closed compartment and electrically connected with terminals therein, actuating mechanism for said isolating switch located entirely within said second compartment but operable from the exterior of the switchgear and causing said movable isolating contacts to be projected through the perforated partition into and to be withdrawn from the permanently closed compartment, and means for causing the selective engagement of the movable contacts with any set of the counterpart contacts.

10. A cubicle type isolating switchgear comprising a cubicle framework divided into a plurality of compartments one of which is permanently closed and separated from a second and adjacent compartment by a perforated partition, a plurality of sets of fixed terminals in said permanently closed compartment, a circuit breaker located with its terminals in said adjacent compartment and so mounted with respect to the switchgear that whilst it can be readily removed therefrom when electrically isolated it cannot be moved for the purpose of effecting its electrical isolation, an isolating switch for said circuit breaker comprising a set of crank contacts having telescopic connection with the circuit breaker terminals and located principally within the second compartment and a plurality of sets of fixed counterpart contacts located entirely within the permanently closed compartment and electrically connected with terminals therein, means whereby said cranked contacts can be collectively rotated, and actuating mechanism for said isolating switch located entirely within said second compartment but operable from the exterior of the switchgear and causing said movable isolating contacts to be projected through the perforated partition into and to be withdrawn from the permanently closed compartment to make selective engagement with any set of the counterpart contacts.

11. A cubicle type isolating switchgear including a cubicle framework having a chamber divided into a plurality of compartments one of which is permanently closed and separated from a second adjacent compartment, a perforated partition separating the two compartments, a set of fixed terminals in said permanently closed compartment, a circuit breaker having terminals disposed in said second compartment, an isolating switch for said circuit breaker comprising a set of movable contacts located within one of said compartments and a set of fixed counterpart contacts located entirely within the permanently closed compartment and electrically connected with terminals therein, and actuating mechanism for said isolating switch located in the same compartment therewith and operable from the exterior of the switchgear to cause said movable contacts to be projected through the perforated partition into and to be withdrawn entirely from the other compartment to effect, respectively, coupling-up and isolation of the circuit breaker, said circuit breaker remaining fixed during the movement of the isolating switch.

12. An electrical switchgear comprising in combination two sets of fixed terminals, a permanently closed compartment containing said terminals and having a wall with perforations therein, a circuit breaker located entirely outside said compartment and adapted by its operation to connect together and disconnect said two sets of terminals, said circuit breaker being so mounted with respect to the switch-gear that whilst it can be readily removed therefrom when and only when electrically isolated, it cannot be moved for the purpose of effecting its electrical isolation, switching means for isolating said circuit breaker, said switching means comprising a group of fixed contacts located in the permanently closed compartment and connected to the terminals therein, another group of fixed contacts constituting terminals of the circuit breaker and a plurality of movable contacts adapted to connect together and to disconnect said two sets of fixed contacts, said movable isolating contacts being so disposed and carried as a group entirely on one side of the perforated wall of said permanently closed compartment that they can be projected through the perforations in said wall or entirely withdrawn therefrom for effecting respectively coupling up and isolation of the circuit breaker, and mechanism operable from the exterior of the switch gear for moving said movable isolating contacts.

13. An electrical switchgear comprising in combination two sets of fixed terminals, a permanently closed compartment containing said terminals and having a wall with perforations therein, a circuit breaker located entirely outside said compartment and adapted by its operation to connect together and disconnect said two sets of terminals, said circuit breaker being so mounted with respect to the switchgear that whilst it can be readily removed therefrom when and only when electrically isolated it cannot be moved for the purpose of effecting its electrical isolation, switching means for isolating said circuit breaker, said switching means comprising a group of fixed contacts located in the permanently closed compartment and connected to the terminals therein, another group of fixed contacts constituting terminals of the circuit breaker and a plurality of movable contacts adapted to connect together and to disconnect said two sets of fixed contacts, said movable isolating contacts being so disposed and carried as a group entirely on one side of the perforated wall of said permanently closed compartment that they can be projected through the perforations in said wall or entirely withdrawn therefrom for effecting respectively coupling up and isolation of the circuit breaker, mechanism operable from the exterior of the switchgear for moving said movable isolating contacts, and means whereby access may be had to the terminals of the circuit breaker only when the latter is fully electrically isolated.

14. An electrical switchgear comprising in combination two sets of fixed terminals, a permanently closed compartment containing said terminals and having a wall with perforations therein, a circuit breaker located entirely outside said compartment and adapted by its operation to connect together and disconnect said two sets of terminals, said circuit breaker being so mounted with respect to the switchgear that whilst it can be readily removed therefrom when electrically isolated it cannot be moved for the purpose of effecting its electrical isolation, plug and socket type switching means for isolating said circuit breaker, said switching means comprising a group of fixed contacts located in the permanently closed compartment and connected to the terminals therein, another group of fixed contacts constituting the terminals of the circuit breaker and a plurality of movable contacts having telescopic engagement with one set of fixed contacts and adapted to connect and disconnect with the other set of fixed contacts, said movable isolating contacts being so disposed and carried as a group entirely on one side of the perforated wall of said permanently closed compartment that they can be projected through the perforations in said wall or entirely withdrawn therefrom for effecting respectively coupling up and isolation of the circuit breaker, and mechanism for moving said movable isolating contacts.

15. An electrical switchgear comprising in combination two sets of fixed terminals, a permanently closed compartment containing said terminals and having a wall with perforations therein, a circuit breaker having its terminals located in an adjacent compartment and adapted by its operation to connect together and disconnect said two sets of terminals, said circuit breaker being so mounted with respect to the switchgear that whilst it can be readily removed therefrom when electrically isolated it cannot be moved for the purpose of effecting its electrical isolation, plug and socket type switching means for isolating said circuit breaker, said switching means comprising a group of fixed contacts located in the permanently closed compartment and connected to the terminals therein, another group of fixed contacts constituting terminals of the circuit breaker, a plurality of movable contacts having telescopic engagement with one set of fixed contacts and adapted to connect and disconnect with the other set of fixed contacts, insulating shrouds on the contacts which constitute circuit breaker terminals and insulating shrouds on said movable contacts, said movable isolating contacts being so disposed and carried as a group entirely in one of the compartments that they can be projected through the perforations in said wall or entirely withdrawn therefrom for effecting respectively coupling up and isolation of the circuit breaker.

16. A switchgear including a housing having two compartments, a circuit breaker in one compartment, an isolating switch, separate from the circuit breaker, having fixed members permanently located in the other compartment and having members movable relatively to the circuit breaker and located principally in one compartment, portions thereof being movable into or out of the other compartment for connecting or disconnecting the circuit breaker with or from said fixed members, and means for operating the movable members of the isolating switch, said circuit breaker remaining fixed in its compartment during the movement of the isolating switch.

17. A switchgear including a housing having a closed compartment, fixed terminals permanently mounted in said compartment, a circuit breaker located outside of said compartment, an isolating switch separate from said circuit breaker having contact members movable relatively to the circuit breaker into and out of said compartment for connecting or disconnecting the circuit breaker with or from said fixed terminals, said circuit breaker remaining normally fixed during the movement of the isolating switch.

In testimony whereof I have hereunto subscribed my name this 9th day of November, 1927.

GEORGE ETHELBERT WHITEHEAD.